Patented Apr. 6, 1954

2,674,628

UNITED STATES PATENT OFFICE 2,674,628

METHOD OF MAKING ALKYL-NITROAROMATIC KETONES

Arthur Alt, Kirkwood, and Robert E. Howard, Brentwood, Mo., assignors to Monsanto Chemical Company, St. Louis, Mo., a corporation of Delaware No Drawing. Application September 17, 1951,
Serial No. 247,022

9 Claims. (Cl. 260—592)

This invention relates to a method of making alkyl-nitroaromatic ketones.

Alkyl-aromatic ketones, often termed mixed ketones, are valuable intermediates in organic synthesis and in the preparation thereof a great variety of methods have been suggested and tried, however, not one has been found entirely satisfactory. Among the methods suggested and tried is the catalytic oxidation of an alkyl substituted aromatic compound, but, as is well known to those familiar with the art on the preparation of alkyl-aromatic ketones via the catalytic oxidation of alkyl substituted aromatic compounds the reaction is hazardous, the percent conversion is generally low, and the reaction product contaminated with impurities which are difficult and expensive to remove.

In accordance with this invention, it has been found that certain alkyl-aromatic ketones, namely alkyl-nitroaromatic ketones of the general formula,

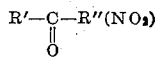

where R' is an alkyl radical such as methyl, ethyl, propyl, isopropyl, tert. butyl, etc., and where R'' is an aromatic radical such as phenyl, bromophenyl, chlorophenyl, biphenyl, naphthyl, chlornaphthyl, etc., can be prepared safely, conveniently and in a relatively inexpensive manner by oxidizing with gaseous oxygen in the absence of a catalyst an alkyl-substituted aromatic compound of the general formula,

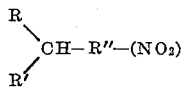

where R is hydrogen or an alkyl radical such as methyl, ethyl, propyl, etc., and where R' and R'' have the same significance as above, providing that the oxidation reaction is carried out within a temperature range of about 135–200° C.

By "gaseous oxygen" in the specification and appended claims is meant to include atmospheric air, molecular oxygen, and mixtures of molecular oxygen with an inert gas. Atmospheric air is the preferred oxidizing medium.

The following is illustrative of the process of this invention.

Example I

Approximately 250 parts by weight of para-nitroethylbenzene is placed in a suitable reaction vessel and heated to about 140° C. Thereupon, while agitating and maintaining the temperature at about 135–145° C., air is bubbled into the heated mass for 28 hours. The oxidized mass is then fractionally distilled and about a 30% conversion to pure para-nitroacetophenone is obtained.

In contrast to the above the conversion of para-nitroethylbenzene to para-nitroacetophenone brought about by bubbling air for 28 hours into a mixture of 250 parts by weight of para-nitroethylbenzene and 4 parts by weight of chromium oxide oxidation catalyst while agitating and maintaining the temperature of the mix at about 135–145° C. is about 10%.

Example II

Approximately 250 parts by weight of ortho-nitroethylbenzene is placed in a suitable reaction vessel and heated to about 150° C. Thereupon, while agitating and maintaining the temperature at about 150–155° C., air is bubbled into the heated mass for about 28 hours. The oxidized mass is then fractionally distilled and about a 30% conversion to pure ortho-nitroacetophenone is obtained.

Employing substantially the same conditions but replacing ortho-nitroethylbenzene with meta-nitroethylbenzene a good conversion to meta-nitroacetophenone is obtained.

Example III

Approximately 250 parts by weight of ortho-nitroisopropyl benzene is placed in a suitable reaction vessel and heated to about 150° C. Thereupon, while agitating and maintaining the temperature at about 150–155° C., air is bubbled into the heated mass for about 28 hours. The oxidized mass is then fractionally distilled and a good conversion to pure ortho-nitroacetophenone is obtained.

In the preparation of nitroacetophenones from the nitroethylbenzenes or the nitroisopropylbenzenes, it is preferable to employ temperatures of 135–160° C., and in particular it is preferred to employ a range of 150–155° C.

The following is further illustrative of this invention.

Example IV

Approximately 250 parts by weight of ortho-nitro-n-propylbenzene is placed in a suitable reaction vessel and heated to about 150° C. Thereupon, while agitating and maintaining the temperature at about 150–155° C., air is bubbled into the heated mass for about 30 hours. The oxidized mass is then fractionally distilled and a good conversion to pure ortho-nitropropiophenone is obtained.

Example V

Approximately 250 parts by weight of ortho-nitroisobutylbenzene is placed in a suitable reaction vessel and heated to about 150° C. Thereupon, while agitating and maintaining the temperature at about 150–155° C., air is bubbled into the heated mass for about 30 hours. The oxidized mass is then fractionally distilled and a good conversion to pure ortho-nitroisobutyrophenone is obtained.

The process of this invention is particularly efficient in the preparation of alkyl-nitroaryl ketones from nitro-alkylbenzenes wherein the alkyl substituent of the latter contains not more than four carbon atoms, e. g., ethyl, propyl, isopropyl, n-butyl, isobutyl and sec. butyl.

Variations in the particular procedures set forth above will be apparent to those skilled in the art and are within the scope of the invention. Although the process of this invention has been described in reference to operations at atmospheric pressure, in certain instances it is advantageous to employ reduced pressures. However, in general, pressures greater than atmospheric are not necessary. While it is preferable to employ atmospheric air as the oxidizing medium, and the invention has been described in particular reference thereto, it is to be understood that molecular oxygen or mixture of oxygen with an inert gas may be used.

What is claimed is:

1. The method of making alkyl-nitroaromatic ketones of the general formula $$R'-\underset{\underset{O}{\|}}{C}-R''(NO_2)$$

where R' is an alkyl radical, and where R'' is an aromatic radical, which comprises oxidizing with gaseous oxygen in the absence of added catalyst an alkyl substituted aromatic compound of the general formula $$\underset{R}{\overset{R'}{\diagdown}}CH-R''(NO_2)$$

where R' and R have the same significance as above, and where R is a member of the group consisting of hydrogen and an alkali radical, at a temperature of about 135–200° C., and recovering from the oxidation product said ketone.

2. The method of making alkyl-nitroaryl ketones of the general formula $$R'-\underset{\underset{O}{\|}}{C}-R''(NO_2)$$

where R' is an alkyl radical, and where R'' is an aromatic hydrocarbon radical, which comprises oxidizing with atmospheric air in the absence of added catalyst an alkyl substituted aromatic compound of the general formula $$R'-CH_2-R''(NO_2)$$

where R' and R'' have the same significance as above, at a temperature of about 135–200° C., and recovering from the oxidation product said ketone.

3. The method of making at atmospheric pressure alkyl-nitroaryl ketones of the general formula

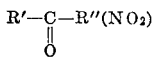

where R' is an alkyl radical containing not more than three carbon atoms, which comprises oxidizing with atmospheric air in the absence of added catalyst an alkyl substituted aromatic compound of the general formula

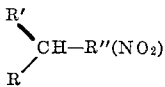

where R' has the same significance as above, at a temperature of about 135–200° C., and recovering from the oxidation product said ketone.

4. The method of making at atmospheric pressure a nitroacetophenone of the general formula

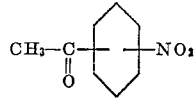

which comprises oxidizing with atmospheric air in the absence of added catalyst an ethylnitrobenzene of the general formula

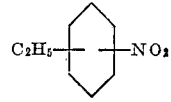

at a temperature of about 135–160° C., and recovering from the oxidation product said ketone.

5. The method of making at atmospheric pressure a nitroacetophenone of the general formula

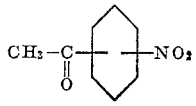

which comprises oxidizing with atmospheric air in the absence of added catalyst an ethylnitrobenzene of the general formula

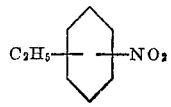

at a temperature of about 150–155° C., and recovering from the oxidation product said ketone.

6. The method of making at atmospheric pressure o-nitroacetophenone which comprises oxidizing with atmospheric air in the absence of added catalyst o-nitroethylbenzene at a temperature of about 150–155° C., and recovering from the oxidation product said ketone.

7. The method of making at atmospheric pressure p-nitroacetophenone which comprises oxidizing with atmospheric air in the absence of added catalyst p-nitroethylbenzene at a temperature of about 150–155° C., and recovering from the oxidation product said ketone.

8. The method of making at atmospheric pressure o-nitropropiophenone which comprises oxidizing with atmospheric air in the absence of added catalyst o-nitro-n-propylbenzene at a temperature of about 150–155° C., and recovering from the oxidation product said ketone.

9. The method of making at atmospheric pressure o-nitroacetophenone which comprises oxidizing with atmospheric air in the absence of added catalyst o-nitroisopropylbenzene at a temperature of about 150–155° C., and recovering from the oxidation product said ketone.

References Cited in the file of this patent

UNITED STATES PATENTS

| Number | Name | Date |
|---|---|---|
| 2,245,528 | Loder | June 14, 1941 |
| 2,199,585 | Bone et al. | May 7, 1950 |

OTHER REFERENCES

Emerson et al., "Jour. Am. Chem. Soc.," vol. 73 (1947), p. 706.